Feb. 4, 1969        E. SNITZER        3,426,293
DIAPHRAGM TUNING OF GAS LASER
Filed Oct. 7, 1964
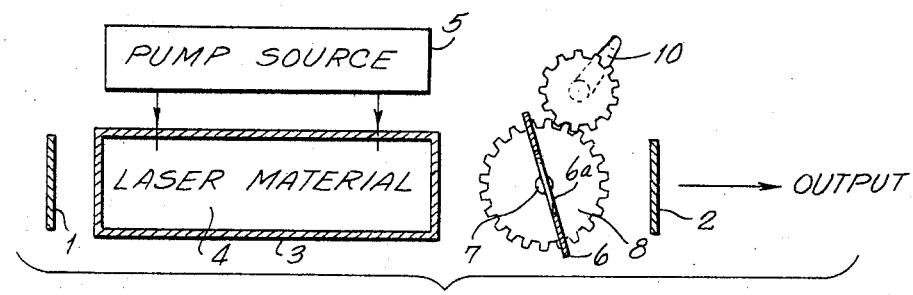
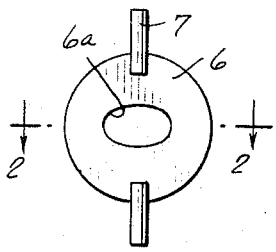 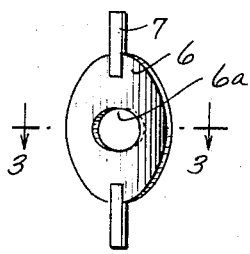 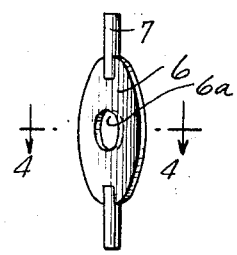
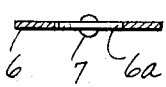 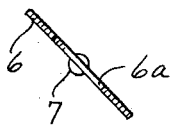 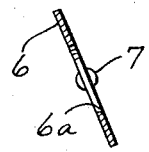
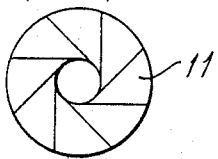
INVENTOR.
ELIAS SNITZER
BY Lester H. Clark
ATTORNEY

3,426,293
DIAPHRAGM TUNING OF GAS LASER

Elias Snitzer, Sturbridge, Mass., assignor, by mesne assignments, to American Optical Corporation, a corporation of Delaware
Filed Oct. 7, 1964, Ser. No. 402,166
U.S. Cl. 331—94.5   3 Claims
Int. Cl. H01s 3/00; G02f 1/30

---

ABSTRACT OF THE DISCLOSURE

A method of controlling the frequency of operation of a gas laser device by positioning an apertured diaphragm within the laser cavity transversely to the axis of the cavity. Varying the area of the aperture in the apertured diaphragm controls the frequency of operation of the laser.

---

This invention relates to laser apparatus and especially to laser apparatus operable at a variable frequency.

Variable frequency lasers of the prior art include gas lasers where the frequency is varied by varying the gas pressure, thereby varying the index of refraction of the material in the light propagation path. Such pressure control of frequency is relatively slow and cumbersome.

It has been shown that, considering a Fabry-Perot interferometer cavity as a waveguide operating at optical frequencies far from cutoff, and assuming that all other cavity parameters are stabilized, that the resonant frequencies of the cavity are determined by the effective radius of the reflecting end plates.

The relationship between the frequency and the effective radius is given in the publication entitled: "Advances in Quantum Electronics" edited by J. R. Singer, Columbia University Press 1961, especially the article therein entitled: "Optical Dielectric Waveguides," by Elias Snitzer, appearing on pages 348 to 369, particularly pages 365 to 367. See Equation 19 of that article (p. 350) which is repeated here for convenience:

$$\sin \phi = \frac{u}{2\pi n_1} \frac{\lambda}{a} \tag{19}$$

In Equation 19, $\phi$ is the angle between the wave normal and the axis of the cavity, $u$ is a cutoff parameter having the value 2.405 for the lowest order mode, as explained on p. 367 of the Snitzer article, $\lambda$ is wave length and $a$ is the effective radius of the end plate. Considering $n_1$ equal to 1, and recasting the equation in terms of frequency $\nu$ instead of wavelength $\lambda$, the above equation becomes:

$$\sin \phi = \frac{2.405}{2\pi a} \frac{c}{\nu} \tag{A}$$

If an apertured diaphragm is placed within a laser cavity, extending transversely to the axis of the cavity, then the aperture in the diaphragm determines the effective area of the reflecting end plates. By varying the area of the aperture, the effective radius of the end plates and hence, the frequency of the laser, may be varied.

An object of the present invention is to provide an improved variable frequency laser.

Another object is to provide an improved means for frequency tuning of a gas laser.

Another object is to provide a variable frequency laser including a diaphragm with a variable aperture for controlling the laser frequency.

Other objects and advantages of the invention will become apparent from a consideration of the following specification and claims, taken together with the accompanying drawing.

In the drawing:
FIG. 1 is a diagrammatic illustration of a variable frequency laser apparatus constructed in accordance with the invention;
FIGS. 2A, 3A and 4A are elevational views of the diaphragm in FIG. 1 at three different positions;
FIGS. 2B, 3B and 4B are cross-sectional views taken respectively on lines 2—2, 3—3 and 4—4 of FIGS. 2A, 3A and 4A, looking in the direction of the arrows; and
FIG. 5 is an elevational view of a modified form of diaphragm which may be utilized in place of the diaphragm of FIGS. 2, 3 and 4.

In a laser, the possible frequencies of oscillation are those at which the separation between the two end reflectors is equal to an integral number of half-wave lengths. The wave lengths $\lambda_0$ at which oscillations may occur satisfy the following equation:

$$N \lambda_0 = 2L \tag{1}$$

Where N is an integer, L is the spacing between two end reflectors, and the wave length $\lambda_0$ is the guide wave length resulting from an interference of plane waves all of whose ray normals make the same angle $\theta$ with respect to the laser axis. The relationship between the guide wavelength $\lambda_0$ and the free space wave length $\lambda$ is:

$$\lambda_0 = \frac{\lambda}{\cos \theta} \tag{2}$$

The free space wave length at which laser oscillations occur is obtained by combining Equations 1 and 2

$$\lambda = \frac{2L}{N} \cos \theta \tag{3}$$

This equation can be written in terms of frequency as $$\nu = \frac{cN}{2L} \frac{1}{\cos \theta} \tag{4}$$

where $c$ is the velocity of light in free space.

The field distribution in the lowest order mode of a gas laser is the same as that in a dielectric wave guide at frequencies far from cutoff.

Equation A above may be rewritten as:

$$2.405 = \frac{2\pi a}{c} \nu \sin \theta \tag{5}$$

Elimination of the angle $\theta$ between the Equations 4 and 5 gives:

$$\nu = c\sqrt{\left(\frac{N}{2L}\right)^2 + \left(\frac{2.405}{2\pi a}\right)^2} \tag{6}$$

If a diaphragm is placed in the laser between the end reflectors so as to reduce the effective value of the radius $a$ by the amount $\delta a$, then the change in frequency $\delta \nu$ is given by:

$$\frac{\delta \nu}{\nu} = \frac{\left(\frac{2.405}{2\pi a}\right)^2}{\left(\frac{N}{2L}\right)^2 + \left(\frac{2.405}{2\pi a}\right)^2} \frac{\delta a}{a} \tag{7}$$

Substituting $1/\lambda_0$ for $N/2L$ from Equation 1 in Equation 7 gives:

$$\frac{\delta \nu}{\nu} = \frac{\left(\frac{2.405}{2\pi} \frac{\lambda_0}{a}\right)^2}{1 + \left(\frac{2.405}{2\pi a} \lambda_0\right)^2} \frac{\delta a}{a} \tag{8}$$

For a laser of radius $a$ equal to 0.5 cm. and operating at a wave length $\lambda_0$ of 0.63 micron, $$\left(\frac{2.405}{2\pi} \frac{\lambda_0}{a}\right)^2 \cong \frac{1}{4} \cdot 10^{-8} \tag{9}$$

Substituting Equation 9 in Equation 8 gives:

$$\frac{\delta \nu}{\nu} \cong \frac{1}{4} \times 10^{-8} \frac{\delta a}{a} \quad (10)$$

This means that a change in radius of the laser by 10% would produce a shift in frequency of about one part in $4 \times 10^9$.

Thus, there is provided a very sensitive means for shifting the frequency of a laser, by simply changing the area of a variable aperture, without any other changes in the laser geometry. The example above was based on excitation of the lowest order $HE_{11}$ mode. If other higher modes are excited analogous tuning can be done by a change in the area of a variable aperture.

FIG. 1 illustrates diagrammatically a variable frequency laser constructed in accordance with the invention. There are shown in FIG. 1 two reflectors 1 and 2 defining the ends of an optical resonant cavity including a rigid walled container 3 filled with laser material 4 and effective to maintain that material at substantially constant pressure and substantially constant volume. All other cavity parameters are assumed stabilized. The container 3 has transparent walls. A pump source 5 of suitable characteristics is provided to supply pumping energy to the laser material 4. For a gas laser, the pump source is typically a radio frequency discharge or a direct current arc discharge in the gas. The reflector 2 has a relatively small percentage of transmission of optical energy so as to provide output radiation as indicated by the legend in the drawing. Between the reflector 2 and the container 3, there is provided a diaphragm 6 having a central aperture 6a aligned with the optical axis of the laser.

As illustrated in FIGS. 2, 3 and 4, the diaphragm 6 may consist of a plate having a central elliptical aperture 6a. The diaphragm plate 6 is shown as having a circular periphery, although its specific peripheral contour is of no particular moment. The diaphragm plate 6 is mounted on a rotatable shaft 7. The shaft 7 is rotated through a suitable motion reducing mechanism, shown by way of example as a large gear 8 fixed on the shaft 7 and a cooperating smaller gear 9 operable by a crank 10. When the plate 6 is viewed in elevation, as in FIG. 2A, the aperture 6a is seen as an ellipse with its long axis horizontal. As the plate 6 rotates about its axis, the projection of the long axis of the ellipse shortens, so that when the plate reaches the position shown in FIG. 3A, the aperture 6a appears as a circle. If the plate 6 is turned further in the same direction, to the position illustrated in FIG. 4A, then the long axis of the ellipse is shortened still further, with the result that the aperture 6a assumes the appearance of an ellipse having its short axis horizontal. In other words, the horizontal axis appears shorter than the vertical axis. The vertical axis maintains its same apparent length in all three positions. FIGS. 2B, 3B and 4B show cross-sectional views of the diaphragm plate 6 corresponding to the three positions shown in FIGS. 2A, 3A and 4A.

FIG. 5 shows a conventional iris diaphragm 11 which may be substituted for the apertured diaphragm plate 6, although the usual photographic iris diaphragm would not provide a sufficiently fine control of frequency.

It may be recognized that by oscillating the diaphragm plate 6 on its axis of rotation, the structure illustrated may be utilized to produce frequency modulation of the laser beam.

The frequency adjustment apparatus constructed in accordance with the invention is highly sensitive. It will commonly be necessary to provide a gear train or other suitable motion reducing mechanism connected to the diaphragm plate in order to control the movements of the plate.

While I have shown and described certain preferred embodiments of my invention, other modifications thereof will readily occur to those skilled in the art, and I therefore intend my invention to be limited only by the appended claims.

I claim:
1. A method for varying the frequency of a laser apparatus including:
   (1) two spaced reflectors facing each other at opposite ends of an optical axis to form a resonant cavity;
   (2) a mass of laserable material between said reflectors;
   (3) a diaphragm between said reflectors, said diaphragm being opaque to optical energy and having a central aperture transparent to optical energy and aligned with said axis; and
   (4) means for varying the area of the aperture;
   comprising the steps of:
   (a) pumping said laserable material to excite said material into oscillations at the lowest order mode which said cavity will support; and
   (b) varying the area of the aperture to vary the frequency of the oscillations in said cavity.

2. The method of varying the frequency of the laser apparatus as defined in claim 1 wherein the area of the aperture is varied by rotating the diaphragm about an axis transverse to said optical axis.

3. The method for varying the frequency of a laser apparatus as defined in claim 1 wherein a diaphragm having an elliptical aperture is varied by rotating said diaphragm about an axis transversed to said optical axis.

References Cited
UNITED STATES PATENTS 1,984,208 12/1934 Engl _____ 350—270
3,242,439 3/1966 Rigden et al. _____ 331—94.5

JEWELL H. PEDERSEN, *Primary Examiner.*

RONALD L. WIBERT, *Assistant Examiner.*

U.S. Cl. X.R.
350—275